United States Patent
Williams et al.

(10) Patent No.: US 12,083,986 B2
(45) Date of Patent: Sep. 10, 2024

(54) SYSTEMS AND METHODS FOR IMPROVED AIRBAG ASPIRATION

(71) Applicant: Autoliv ASP, Inc., Ogden, UT (US)

(72) Inventors: Jeffrey D. Williams, Roy, UT (US); F. Chad Copier, Highland, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 18/207,123

(22) Filed: Jun. 7, 2023

(65) Prior Publication Data
US 2023/0331184 A1 Oct. 19, 2023

Related U.S. Application Data

(63) Continuation of application No. 17/453,178, filed on Nov. 1, 2021, now Pat. No. 11,794,685.

(51) Int. Cl.
*B60R 21/217* (2011.01)
*B60R 21/26* (2011.01)
*B60R 21/30* (2006.01)

(52) U.S. Cl.
CPC ............ *B60R 21/30* (2013.01); *B60R 21/217* (2013.01); *B60R 21/26* (2013.01)

(58) Field of Classification Search
CPC .............................. B60R 21/30; B60R 21/217
See application file for complete search history.

(56) References Cited

U.S. PATENT DOCUMENTS

| | | | |
|---|---|---|---|
| 3,801,127 A | 4/1974 | Katter et al. | |
| 3,909,037 A * | 9/1975 | Stewart | B60R 21/30 417/179 |
| 3,910,595 A * | 10/1975 | Katter | B60R 21/30 280/732 |
| 5,592,812 A * | 1/1997 | Hinshaw | C06B 31/00 149/46 |
| 5,605,347 A * | 2/1997 | Karlow | B60R 21/2171 248/99 |
| 5,692,768 A * | 12/1997 | Mihm | B60R 21/30 280/728.2 |

(Continued)

FOREIGN PATENT DOCUMENTS

| | | |
|---|---|---|
| EP | 0046275 A1 | 2/1982 |
| WO | 9640556 | 12/1996 |

OTHER PUBLICATIONS

Feb. 21, 2023 International Search Report—PCT/US22/048090 (4 pgs).
Feb. 21, 2023 Written Opinion—PCT/US22/048090 (9 pgs).

*Primary Examiner* — Nicole T Verley
(74) *Attorney, Agent, or Firm* — Matthew D. Thayne; Thayne and Davis LLC

(57) ABSTRACT

Airbag cushion assemblies for aspirating ambient air and related assemblies. Some embodiments may comprise an aspirating airbag cushion assembly comprising an airbag cushion, which may be configured to deploy from a housing or the like. The assembly may further comprise one or more inflation conduits configured to deliver inflation gas into the airbag cushion through a plurality of inflation ports. Each inflation conduit may comprise one or more features to improve aspiration efficiency, such as expanded distal portions and/or angled features to redirect inflation gases in a manner to improve the efficiency of the inflation gas to aspirate ambient air into the cushion.

20 Claims, 4 Drawing Sheets

(56) References Cited

U.S. PATENT DOCUMENTS

| | | | |
|---|---|---|---|
| 9,039,038 B2 | 5/2015 | Breed et al. | |
| 10,124,759 B2 * | 11/2018 | Smith | C06D 5/02 |
| 10,913,423 B2 * | 2/2021 | Williams | B60R 21/26 |
| 10,988,104 B2 * | 4/2021 | Williams | B60R 21/264 |
| 11,155,235 B2 | 10/2021 | Breed et al. | |
| 11,572,030 B1 * | 2/2023 | Parkinson | B60R 21/261 |
| 2018/0079384 A1 * | 3/2018 | Smith | C06D 5/02 |
| 2019/0126887 A1 * | 5/2019 | Williams | B60R 21/36 |
| 2019/0359167 A1 | 11/2019 | Breed et al. | |
| 2020/0101933 A1 * | 4/2020 | Williams | B60R 21/26 |
| 2022/0041126 A1 * | 2/2022 | Breed | B60R 21/30 |

* cited by examiner

SYSTEMS AND METHODS FOR IMPROVED AIRBAG ASPIRATION

CROSS-REFERENCE TO RELATED APPLICATIONS

This application is a continuation of co-pending application Ser. No. 17/453,178 filed on Nov. 1, 2021, and titled "SYSTEMS AND METHODS FOR IMPROVED AIRBAG ASPIRATION," which is hereby incorporated herein by reference in its entirety.

SUMMARY

Various improvements in vehicle technologies, such as autonomous vehicles, may require changes in the way airbag assemblies operate. For example, in some autonomous vehicles, or other newer vehicles, larger airbags may be used. This may be needed, for example, due to a larger distance between the airbag module and the vehicle occupant. In some systems, it is even contemplated that a single cushion may be used to provide protection to multiple occupants.

However, existing aspirating airbag assemblies suffer from many drawbacks, such as being large, bulky, and/or complicated, often requiring many different components and valve mechanisms. Such existing assemblies are often complicated and/or unnecessarily difficult to assembly, adding further to costs.

Moreover, although other aspirations systems have been used, they often are less efficient than they could be, and have aspiration ratios that can be improved.

The present inventors have therefore determined that it would be desirable to provide systems and methods that overcome one or more of the foregoing limitations and/or other limitations of the prior art. In some embodiments, the inventive concepts disclosed herein may allow for providing an assembly that improves aspiration efficiency by, for example, presenting inflation ports to generate the aspiration in multiple rows on each inflation conduit and/or forming the ports with one or more features to improve efficiency. For example, some embodiments, may comprise inflation ports having expansion angle and/or Prandtl-Meyer features to direct the supersonic plumes in regions designed to improve the velocity of the gas, generate lower pressures, and/or improve aspiration efficiency.

In a more specific example of an aspirating airbag cushion assembly according to some embodiments, the assembly may comprise an airbag cushion, which may be part of a housing and/or airbag package comprising an airbag cushion. An aspiration housing may be fluidly coupled to the airbag cushion and/or airbag cushion housing. The aspiration housing may comprise an aspiration inlet configured to allow for receipt of ambient air into the airbag cushion during inflation of the airbag cushion. The assembly may further comprise an inflation module comprising an inflator an inflation conduit fluidly coupled with the inflator. The inflation conduit may comprise an elongated axis and may be configured to deliver inflation gas from the inflator into the airbag cushion through a plurality of aspiration ports. One or more (in some embodiments, each) of the inflation conduits may comprise at least two rows of aspiration ports.

In some embodiments, each of the aspiration ports in a first row of the at least two rows of aspiration ports is offset from a center of the inflation conduit, wherein the center is measured perpendicular to the elongated axis, towards a first side of the inflation conduit adjacent to a first aspiration opening of the aspiration inlet. In some such embodiments, each of the aspiration ports in a second row of the at least two rows of aspiration ports is offset from the center towards a second side of the inflation conduit opposite from the first side and adjacent to a second aspiration opening of the aspiration inlet.

In some embodiments, each of the aspiration ports in the first row may be angled towards the first side of the inflation conduit and/or each of the aspiration ports in the second row may be angled towards the second side of the inflation conduit.

In some embodiments, each of the aspiration ports of the plurality of aspiration ports may comprise an expanded distal portion. In some such embodiments, the expanded distal portion may comprise an angled surface angled towards a vertical direction at least substantially corresponding with an incoming direction of ambient air through the aspiration inlet during deployment. In some such embodiments, the angled surface may be parallel, or at least substantially parallel, with the vertical direction.

In some embodiments, the angled surface may define an angle of about 25 degrees relative to an adjacent proximal portion of each of the aspiration ports.

In some embodiments, the at least two rows of aspiration ports may comprise a first row and a second row. In some such embodiments, the first row may comprise aspiration ports that are offset from aspiration ports in the second row such that each of the aspiration ports of the first row is positioned at a location along the elongated axis of the inflation conduit that is adjacent to an aspiration port in the second row.

Some embodiments may further comprise a plurality of inflation conduits fluidly coupled with the inflator, wherein each inflation conduit of the plurality of inflation conduits comprises an elongated axis, and wherein each inflation conduit of the plurality of inflation conduits is configured to deliver inflation gas from the inflator into the airbag cushion through a plurality of aspiration ports. In some such embodiments, each inflation conduit of the plurality of inflation conduits comprises at least two rows of aspiration ports.

In another example of an aspirating airbag cushion assembly according to some embodiments, the assembly may comprise an airbag cushion and a housing comprising an aspiration inlet configured to allow for receipt of ambient air into the airbag cushion during inflation. The assembly may further comprise an inflation module comprising an inflation conduit configured to deliver inflation gas from an inflator, wherein the inflation conduit comprises a plurality of inflation ports configured to, upon actuation of the inflator, draw ambient air through the aspiration inlet. In some embodiments, at least a subset of the plurality of inflation ports may comprise a multi-faceted port. For example, in some embodiments, the multi-faceted port may comprise a first portion directing inflation gas away from a vertical direction at least substantially corresponding with an incoming direction of the ambient air through the aspiration inlet during deployment; and a second portion angled relative to the first portion in a direction angled towards the vertical direction relative to the first portion.

Some embodiments may further comprise a valve assembly comprising at least one valve flap, wherein the valve assembly is configured such that the at least one valve flap opens upon actuation of the inflator, and wherein the valve assembly is further configured such that the at least one valve flap closes following aspiration of the airbag cushion to prevent air and inflation gas from exiting through the aspiration inlet following inflation of the airbag cushion.

In some embodiments, the inflation conduit may comprise a first row of inflation ports adjacent to a first side of the inflation conduit and a second row of inflation ports adjacent to a second side of the inflation conduit opposite the first side. In some such embodiments, the first row may comprise aspiration ports that are offset from and/or staggered relative to aspiration ports in the second row such that each of the aspiration ports of the first row is positioned at a location along an elongated axis of the inflation conduit that is adjacent to an aspiration port in the second row.

In some embodiments, the second portion may at least partially define an expansion feature that widens the inflation port at a distal portion of the inflation port.

In some embodiments, the second portion may be at least substantially parallel with the vertical direction.

In still another example of an aspirating airbag cushion assembly according to some embodiments, the assembly may comprise an airbag cushion and an aspiration inlet configured to allow for receipt of ambient air into the airbag cushion during inflation of the airbag cushion. The assembly may further comprise a plurality of inflation conduits. Each of the plurality of inflation conduits may comprise a first row of inflation ports and a second row of inflation ports. Preferably, each of the inflation ports in the first row comprises an angled surface angled towards the inflation ports in the second row, and each of the inflation ports in the second row comprises an angled surface angled towards the inflation ports in the first row. The assembly may further comprise a valve assembly comprising at least one valve configured to open to allow for receipt of ambient air through the aspiration inlet and configured to close following inflation of the airbag cushion.

In some embodiments, one or more (preferably each) of the angled surfaces expands a size of its respective inflation port.

In some embodiments, each of the angled surfaces extends in a direction relative to an adjacent and/or proximal portion of its respective port that is at least substantially parallel to a vertical direction, the vertical direction being at least substantially perpendicular to a plane extending through each longitudinal axis of each of the plurality of inflation conduits. In some such embodiments, each of the angled surfaces may extend at an angle of about 25 degrees from an adjacent surface of its respective inflation port.

In some embodiments, each of the inflation ports may extend, at least in part, at an angle of about 25 degrees from a direction at least substantially parallel to a vertical direction, the vertical direction being at least substantially perpendicular to a plane extending through each longitudinal axis of each of the plurality of inflation conduits.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
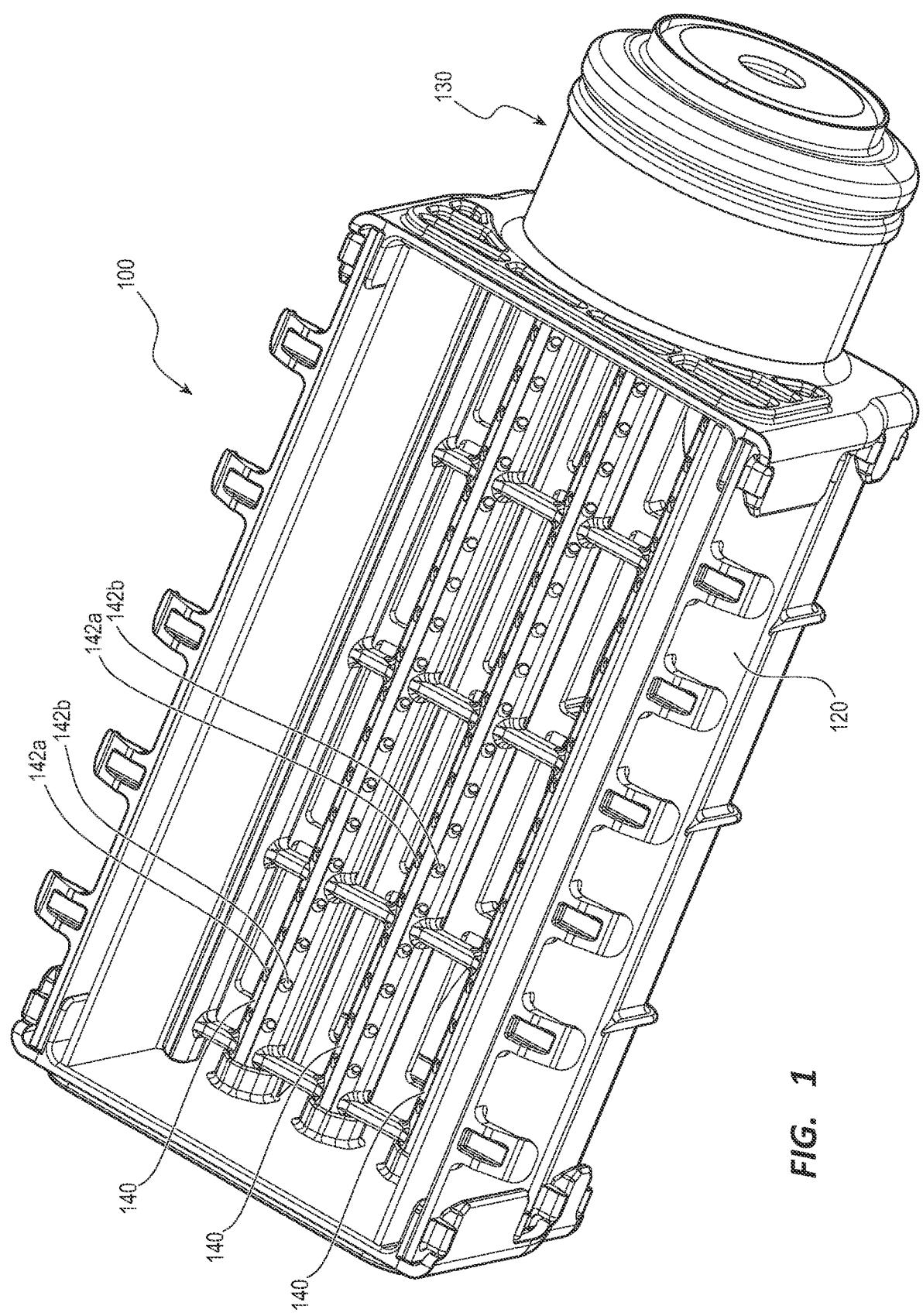
FIG. 1 is a perspective view of an aspirating airbag inflation assembly according to some embodiments.

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

Apparatus, methods, and systems are disclosed herein relating to aspirating airbag cushion assemblies configured to utilize ambient air, in some cases along with inflation gas, to inflate larger airbag cushions, such as, in some embodiments, airbag cushions for multiple occupants, airbag cushions for autonomous vehicles, or pedestrian airbag cushions. Various embodiments disclosed herein may provide unique features to improve, for example, the coupling mechanisms, components, and/or functionality of such assemblies.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIG. 1 depicts an aspirating airbag cushion assembly 100. Aspirating airbag cushion assembly 100 comprises an airbag cushion package 110, which includes an airbag cushion 124 (not shown in FIG. 1; see FIG. 2) positioned and configured to deploy therefrom. Aspirating airbag cushion assembly 100 further comprises an aspiration housing 120 coupled to the airbag cushion package 110. The aspiration housing 120 comprises an open side and/or opening at its upper side for receiving an airbag cushion and/or coupling and/or receiving airbag cushion package 110 thereto. Aspirating airbag cushion assembly 100 may be attached to aspiration housing 120 with elongated rails 113 to hold airbag cushion 124 in place for packaging and deployment. Opposite this open side, aspiration housing 120 comprises an aspiration inlet configured to allow for receipt of ambient air into the airbag cushion during inflation.

In the depicted embodiment, the aspiration inlet comprises a plurality of openings aligned in a grid pattern along this side of aspiration housing 120, which openings are defined by cross-members and inflation conduits 140. However, it is contemplated that, in alternative embodiments, the aspiration inlet may comprise a single opening (in some such embodiments, the entire lower side of aspiration housing 120 may be open) or may comprise any other suitable number of openings as desired.

An inflation module 130 may be coupled to the aspiration housing 120. As described in greater detail below, in preferred embodiments, inflation module 130 may be slidably coupled to the aspiration housing 120. Inflation module 130 comprises an inflator, which inflator may comprise, for example, a disc inflator. However, other embodiments are contemplated in which the inflator may instead comprise another type of inflator, such as a tubular inflator or another suitable inflator.

Aspiration housing 120 may comprise a first or lower side comprising an aspiration inlet, as mentioned above, that may be configured to allow for receipt of ambient air into the airbag cushion 124 during inflation. Aspiration housing 120 may further comprises a second or upper side opposite from the first side that is configured to receive airbag cushion 124 and/or airbag cushion package 110 therein. A third side of aspiration housing 120 extends between the upper and lower sides/ends and may be closed or at least substantially closed.

This open side or, in other embodiments, one or more openings, may be configured to be closed, or at least substantially closed, by inflation module 130. More particularly, inflation module 130 may be configured to be received in the open side of aspiration housing 120 and to close this side/opening upon being fully coupled with, which in the case of the depicted embodiment means fully slid into, inflation module 130.

Inflation module 130 further comprises a plurality of inflation conduits 140, such as tubes, which are fluidly coupled with the inflator. Each of the inflation tubes 140 comprises a plurality of inflation or aspiration ports 142 (alternatively referred to as aspiration ports since they assist in drawing ambient air into the cushion 124 during inflation) and each of the inflation tubes 140 and/or ports 142 is configured to deliver inflation gas from the inflator into the airbag cushion 124. Preferably, assembly 100 is configured such that the inflation gas is delivered at a sufficiently high velocity to draw ambient air through the aspiration inlet and into the airbag cushion 124 during inflation. In alternative embodiments, each of ports 142 may be formed on a nozzle or the like, which may extend from one or more of inflation conduits 140.

In the depicted embodiment of FIG. 1, the inflation/aspiration ports 142 are formed within each inflation conduit 140 in two opposing rows. Thus, ports 142a are part of a first row and ports 142b are part of a second row. Preferably, these two rows are offset from one another relative to the center of each inflation conduit 140. In other words, if the center is measured perpendicular to the elongated axis of each inflation conduit 140, each of the ports 142a in one row is offset from the center towards a first side of the inflation conduit 140, which is preferably adjacent to a first aspiration opening of the aspiration inlet, and each of the aspiration ports 142b in a second row of aspiration ports is offset from the center towards a second side of the same inflation conduit 140 opposite from the first side and preferably adjacent to another second aspiration opening of the aspiration inlet. As discussed below and depicted in the embodiment of FIG. 4, in some embodiments, the ports may also, or alternatively, be formed in rows that are staggered and/or offset relative to each other rather than the center of each conduit.

In this manner, the jets/inflation delivered through the ports 142 can be positioned closer to the opposing edges of the conduits 140, which may allow for a more efficient aspiration system by generating better aspiration flow. Without being limited by theory, it is thought that this is because placement of what is preferably a supersonic plume of gas closer to the edge of the tube/conduit 140 positions the low-pressure zone generated by these high-velocity gases closer to where the ambient air is to pull into or aspirate the air at a higher volume more efficiently into the cushion. This may also improve the vacuum pressure to aspirate more ambient air into the cushion relative to the amount of inflation gases needed to generate the flow, thereby preferably making the aspiration ratio of the assembly higher.

It may also be preferred that the ports 142 be spaced apart from one another sufficiently such that the streamlines of the expanding gas do not intersect, or at least intersect minimally. Thus, preferably the ports 142 are spaced apart with the maximum amount of space in between each adjacent port within the area allotted to the aspiration inlet, such as the case in the depicted embodiment.

Figure 2:
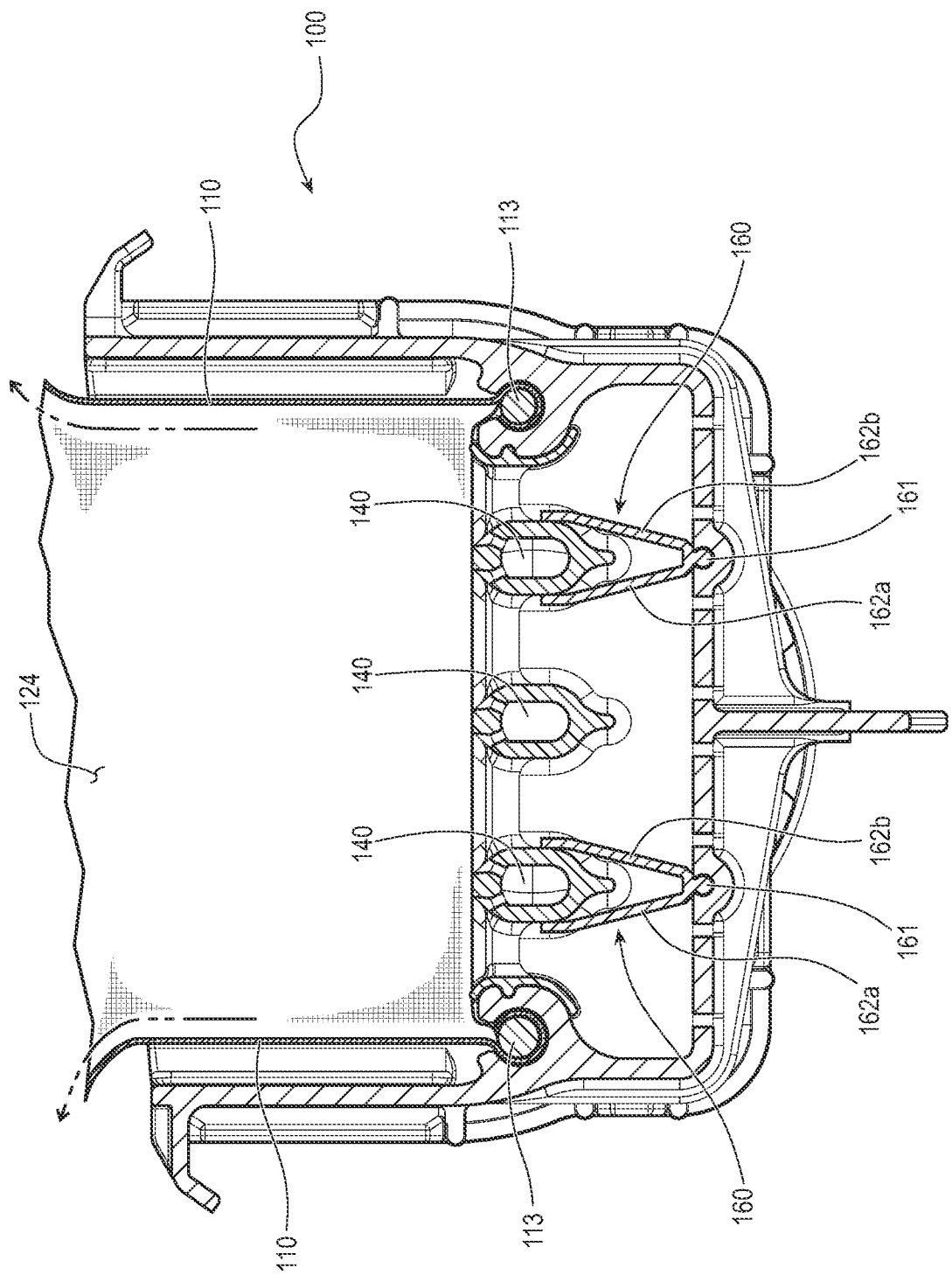
FIG. 2 is a cross-sectional view of the aspirating airbag inflation assembly of FIG. 1.

As shown in FIG. 2, assembly 100 may further comprise a valve assembly 160. Valve assembly 160 may comprise one or more valves preferably configured to automatically open upon actuation of the inflator and further configured to automatically close during inflation of the airbag cushion to prevent air and inflation gas from exiting through the aspiration inlet below the valve flaps of valve assembly 160. In some embodiments, the one or more valves of the valve assembly 160 may be configured to automatically close at a predetermined stage during inflation of the airbag cushion.

In the depicted embodiment, valve assembly 160 comprises a first valve 162a or valve flap and a second valve 162b or valve flap. Valves 162a and 162b may comprise flaps, such as butterfly flaps, that are configured to automatically open and close at least two separate openings of the aspiration inlet. In some embodiments, including the depicted embodiment, these flaps may be configured to open and close each of the openings defining the aspiration inlet. In the depicted embodiment, each of valves 162a and 162b comprises two flaps that are pivotably coupled to one another at a central portion, such as hinge portion 161, of the respective valves. Thus, as shown in FIG. 2, valves 162a and 162b may be configured to pivot to their respective open configurations during inflation by pivoting their respective flaps at this central portion/line 161.

In some embodiments, the valve flaps of valves assembly 160 may be sufficiently flexible such that the flaps flex during inflation. In some embodiments, however, these flaps may be sufficiently rigid so as to maintain a bias towards their respective closed configurations. In other words, the valves and/or valve flaps may be configured to require force to open (generated by a partial vacuum within an associated airbag cushion) and are otherwise biased towards their respective closed configurations. Although the valve flaps themselves may be configured to perform this function alone in some embodiments, in other embodiments, a support member of such valve flaps, such as a hinge, may be provided to facilitate a desired opening and closing function.

In some embodiments, the valve flaps may comprise a relatively rigid material (at least compared to the fabric of airbag cushion 124). In some embodiments, such valve flaps may be configured to operate in a desired manner simply by rigidly coupling such flaps adjacent to the aspiration inlet. Alternatively, flap(s) 162a/162b may be hinged at one end such that they are biased towards their respective closed positions. Some embodiments may comprise flaps that partially or fully overlap with one another.

Valve assembly 160 may similarly be slidably couplable with aspiration housing 120. Thus, for example, a pivot point of the flaps 162a/162b of valve assembly 160 may comprise an elongated protrusion or bead 161, as shown in FIG. 2 (which shows flaps 162a/162b in an open configuration), which may be slidably received within a corresponding, elongated slot formed along the lower portion of aspiration housing 120. Both protrusions/beads 161 and their corresponding slot preferably comprises a bulbous lower portion and a narrowed neck portion to ensure that valve assembly 160 is kept in its proper position within aspiration housing 120.

Again, the cross-sectional view of FIG. 2 depicts flaps/valves 162a and 162b of valve assembly 160 in an open configuration during inflation of airbag cushion 124. As previously mentioned, by directing high-velocity inflation gas through inflation ports 142, a pressure differential is generated that preferably results in the opening of the valves and/or flaps of valve assembly 160 automatically (i.e., without further mechanical elements or other forces/actions). This allows the inflation of airbag cushion 124 to be supplemented by ambient air, which may enter airbag cushion 124 through the one or more openings of the aspiration inlet. Preferably, inflation ports 142 may be used to generate a sufficient pressure differential to allow for valve flaps 162a/162b to automatically open. This same pressure differential may then allow ambient air to assist with inflation of airbag cushion 124. Preferably, inflation gases are introduced in a forceful manner into airbag cushion 124. Thus, in addition to and/or as an alternative to the pressure differential, the velocity and/or rate of volume of gas delivered through ports 142 may be sufficient to cause ambient air to be entrained within the inflation gas and therefore aspirated into airbag cushion 124 along with this inflation gas.

At a desired point during inflation, valves and/or flaps 162a/162b of valve assembly 160 automatically close to prevent the air and inflation gases from escaping, or at least reduce the amount of air and inflation gases that may escape from, airbag cushion 124. Again, this may be accomplished in a number of ways but, preferably, the valves and/or flaps of valve assembly 160 are biased, either by way of a hinge, by way of their physical makeup and coupling/pivot point(s) of attachment, or otherwise, towards their respective closed positions, preferably such that a threshold amount of force and/or pressure is required in order to reposition them to their open configurations, after which they automatically return to their closed configurations.

Thus, the valve(s)/flap(s) of valve assembly 160 are preferably configured to operate in a closed configuration initially, and then automatically open during inflation, which may be caused by generating a partial vacuum within the airbag cushion 124 by, for example, the inflation gas from an inflator. Following inflation, the system may be configured to automatically close again to maintain gases (both ambient air and inflation gas) in the cushion during occupant contact. The system may be specifically configured to provide for these three stages (closed, open during inflation, and re-closing during or following inflation) automatically at desired times by virtue of the positioning and configuration of the valve(s), conduits, ports, etc.

More specifically, upon initial deployment, there may be significant pressure achieved in the cushion 124 prior to the cushion 124 breaking through a cover (the "breakout phase" of the deployment). With this high pressure, the potential for leakage out the back of the housing is very high without blocking the aspiration inlet. Failure to block the aspiration inlet may also inhibit desired cushion restraint. Following the breakout phase, it is preferred that the aspiration inlet be opened as quickly as possible to allow for ambient air to assist in the inflation process.

Again, following the decrease of the pressure differential previously mentioned, a pressure differential developed in an opposite direction, and/or the cessation of inflation gasses being delivered through inflation ports 142, valve flaps 162a/162b may be configured to automatically close again. As previously mentioned, in some embodiments, valve flaps 162a/162b may be biased towards their respective closed positions to facilitate this stage of inflation. One or more airbag cushion vents (not shown) may be used and may be tuned to provide desired deployment/restraint characteristics.

Figure 3:
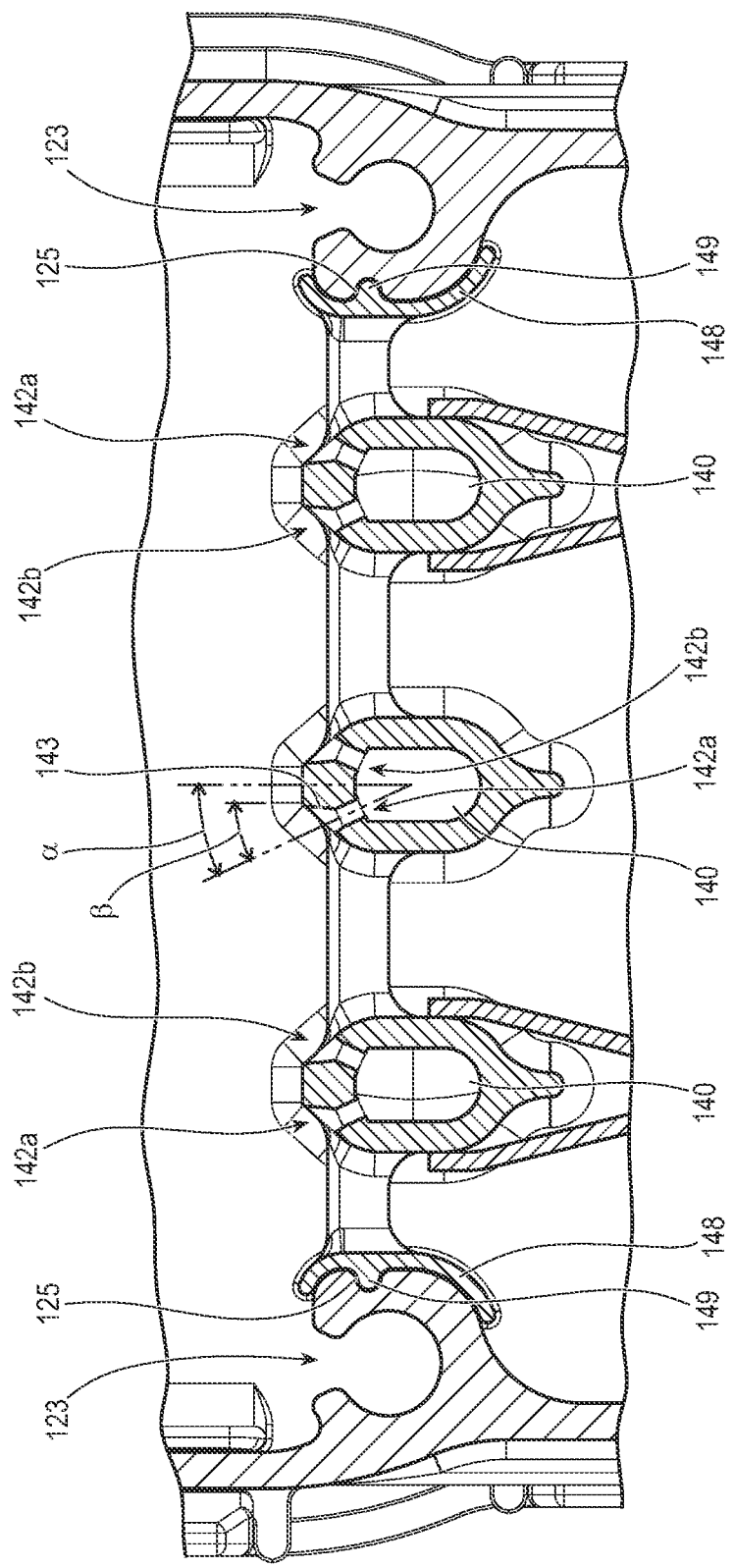
FIG. 3 is a close-up, cross-sectional view illustrating a preferred expansion angle feature for the aspiration ports to improve aspiration efficiency.

In the depicted embodiment, aspiration housing 120 comprises a pair of elongated channels 123 configured to receive a corresponding pair of elongated rails 113 formed on airbag cushion package 110, as shown in FIGS. 2 and 3. This may allow airbag cushion package 110, aspiration housing 120, and inflation module 130 to be slidably coupled to one another, in some embodiments without use of, or at least substantially without the use of, any fasteners.

As also shown in these figures, inflation module 130 further comprises a frame defined by a plurality of support members extending perpendicular to the inflation conduits 140. Additional support members may extend parallel to conduits 140. Such parallel support members 148 may bound conduits 140 on opposite ends of the frame. As shown in FIG. 3, a pair of elongated grooves 125 may be formed within aspiration housing 120. In some embodiments, support members 148 may comprise protrusions 149 that may be received within grooves 125.

FIG. 3 also depicts a preferred configuration of inflation/aspiration ports 142. In particular, ports 142a and 142b are preferably formed with multiple parts that result in an expanded distal portion. In some even more preferred embodiments, the expanded distal portion comprises an angled surface forming an expansion angle feature, which may further comprise a Prandtl-Meyer feature. In other words, in some embodiments, each of the ports 142a in the first row is initially angled outwardly towards a first side of its inflation conduit 140 and each of the ports 142b in the second row is angled outwardly in the opposite direction towards a second, opposite side of the inflation conduit 140.

Distal of this portion (from the perspective of the inflation gas), one or more surfaces 143 defining an expansion angle are formed, which may open/enlarge the size of the port 142 and/or preferably be angled in the opposite direction relative to the adjacent, proximal portion of the port 142. In some embodiments, including the depicted embodiment of FIGS. 2 and 3, each angled surface 143 may be angled towards a vertical direction at least substantially corresponding with an incoming direction of ambient air through the aspiration inlet during deployment (vertical is the up direction in FIGS. 2 and 3). In preferred embodiments, including the depicted embodiment, the angled surface(s) 143 may further extend in a direction at least substantially perpendicular to a plane extending through each longitudinal axis of each of the plurality of inflation conduits 140.

In still more preferred embodiments, the ports 142a and 142b may, in their respective proximal portions, be angled between about 0 degrees and about 45 degrees relative to the vertical direction (angle α in FIG. 3). In some such embodiments, angle α may be between about 10 degrees and about 30 degrees. In some such embodiments, angle α may be about 25 degrees.

Similarly, in preferred embodiments, angled surface 143 defines an angle of between about 5 degrees and about 35 degrees relative to an adjacent proximal portion of each of its respective aspiration port (angle β in FIG. 3). In some such embodiments, angle β may be about 25 degrees. Thus, in the depicted embodiment, angles α and β may be the same, or at least substantially the same, although this need not be the case for all contemplated embodiments.

Again, without being limited by theory, it is thought that this preferred geometry allows the plume to change from the proximal angled portion (about 25 degrees from vertical in preferred embodiments) to vertical or almost vertical so the plume runs more parallel to the aspirated air flowing into the cushion 124 of the assembly 100. Additionally, the use of Prandtl-Meyer angle surfaces may be useful to create an expansion fan, which, in effect, increases the gas velocity along the outer surface of the plume opposite the angled surface. The turning of the plume along with the outer most surface gas velocity increase may facilitate a more efficient aspiration by, for example, allowing for more aspirated air mass flow compared to inflator gas mass flow required to generate aspiration.

Figure 4:
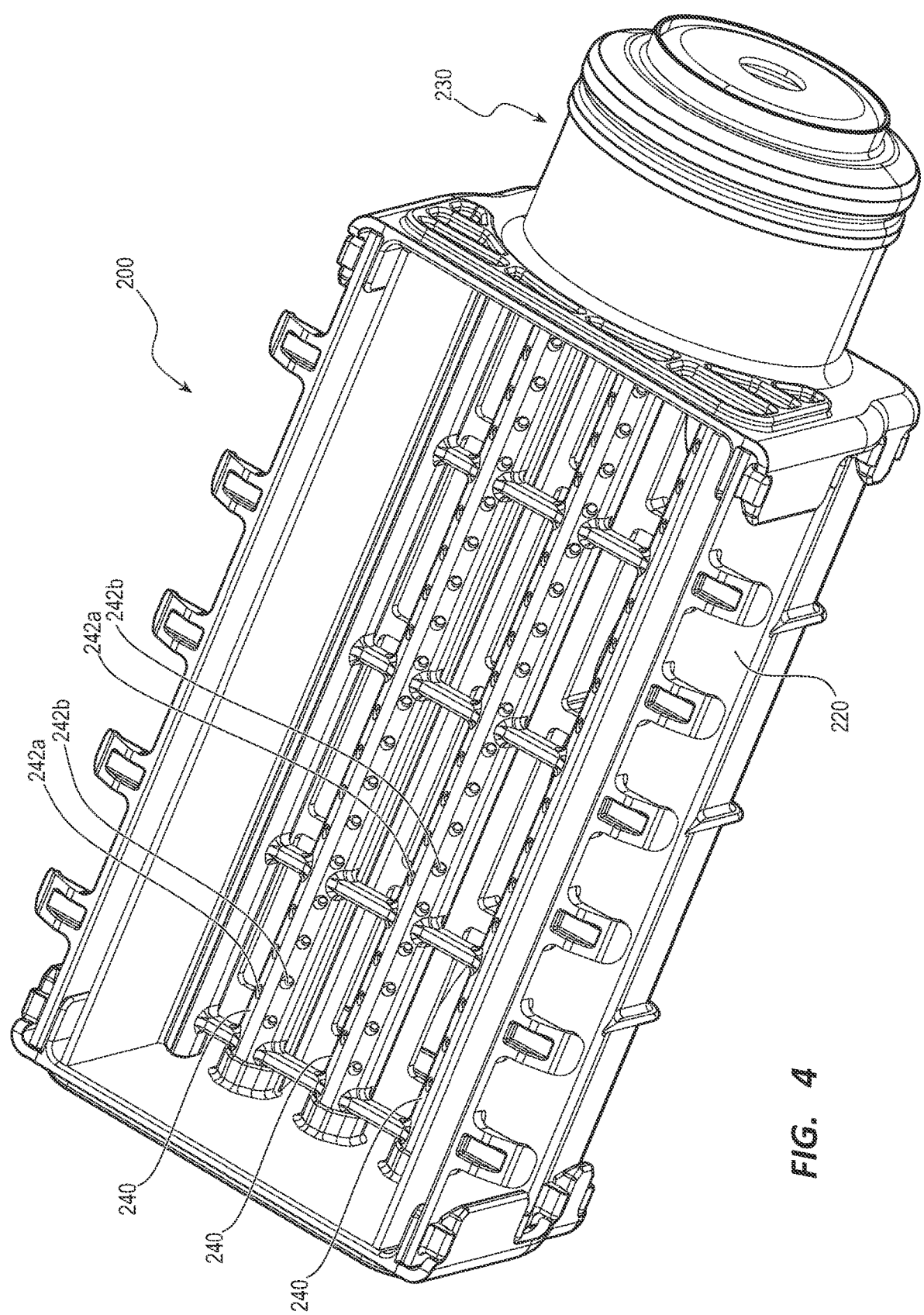
FIG. 4 is a perspective view of an aspirating airbag inflation assembly according to other embodiments.

FIG. 4 depicts an aspirating airbag cushion assembly 200 according to an alternative embodiment. Aspirating airbag cushion assembly 200 comprises an airbag cushion package and/or housing comprising an airbag cushion (the housing and cushion are not shown in FIG. 4 but may be similar to those shown in FIG. 2) positioned and configured to deploy therefrom. Aspirating airbag cushion assembly 200 further comprises an aspiration housing 220 coupled to the airbag cushion housing. The aspiration housing 220 may be similar to aspiration housing 120 and may therefore comprise, for example, an aspiration inlet configured to allow for receipt of ambient air into the airbag cushion during inflation.

Similarly, an inflation module 230 may be coupled to the aspiration housing 220. Inflation module 230 may, like inflation module 130, further comprise a plurality of inflation conduits/tubes 240 that are fluidly coupled with the inflator. Each of the inflation tubes 240 again comprises a plurality of inflation or aspiration ports 242 and each of the inflation tubes 240 and/or ports 242 is configured to deliver inflation gas from the inflator into the airbag cushion.

The inflation/aspiration ports 242 are, like ports 142, formed within each inflation conduit 240 in two opposing rows. Thus, ports 242a are part of a first row and ports 242b are part of a second row. Also like ports 142, these two rows are offset from one another relative to the center of each inflation conduit 240. In other words, if the center is measured perpendicular to the elongated axis of each inflation conduit 240, each of the ports 242a in one row is offset from the center towards a first side of the inflation conduit 240, which is preferably adjacent to a first aspiration opening of the aspiration inlet, and each of the aspiration ports 242b in a second row of aspiration ports is offset from the center towards a second side of the same inflation conduit 240 opposite from the first side and preferably adjacent to another second aspiration opening of the aspiration inlet.

However, unlike ports 142, the ports 242a in the first row are staggered or offset from the ports 242b in the second row such that each of the ports 242a of the first row is positioned at a location along the elongated axis of the inflation conduit 240 on which both rows are positions that is adjacent to a port 242b in the second row. This staggered feature of assembly 200 may have several benefits. For example, having the ports staggered may provide increased strength to the assembly to improve deployment loading strength. This may also provide for an increased area between the closest ports of the opposing rows to increase part strength.

Other features of the ports and/or the remainder of the assembly 200 may be identical or similar to any of those previously described. For example, ports 242 may, in some embodiments, be angled outward away from the vertical direction, at least initially. In some such embodiments, the ports may be multi-faceted, multi-sectioned, and/or expanded in area from a proximal to distal direction. For example, angled surfaces, such as Prandtl-Meyer expansion angle surfaces, may direct the inflation gas from an initially outward direction to a vertical, or nearly vertical, direction to improve the efficiency of the aspiration of the adjacent, ambient air during deployment.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:
1. An aspirating airbag cushion assembly, comprising:
an airbag cushion;

a housing configured to allow for receipt of ambient air into the airbag cushion during inflation of the airbag cushion; and an inflation module comprising a plurality of elongated inflation conduits configured to deliver inflation gas from an inflator, wherein each of the inflation conduits comprises a plurality of inflation ports, wherein each of the plurality of inflation ports is configured to, upon actuation of the inflator, draw ambient air into the airbag cushion, and wherein at least a subset of the plurality of inflation ports comprises an expanded distal portion, wherein the expanded distal portion defines a greater cross-sectional area of each inflation port of the at least a subset of the plurality of inflation ports than an adjacent portion of each inflation port extending into an adjacent inflation conduit.

2. The aspirating airbag cushion assembly of claim 1, wherein the housing comprises an aspiration inlet configured to allow ambient air into the housing, and wherein the aspiration inlet is defined, at least in part, by the plurality of elongated inflation conduits.

3. The aspirating airbag cushion assembly of claim 1, wherein each of the plurality of inflation ports comprises a circular cross-section.

4. The aspirating airbag cushion assembly of claim 1, wherein each of the plurality of inflation ports comprises an expanded distal portion.

5. The aspirating airbag cushion assembly of claim 4, wherein the expanded distal portion of each of the plurality of inflation ports is defined, at least in part, by an angled surface angled towards a vertical direction at least substantially corresponding with an incoming direction of ambient air into the airbag cushion during deployment.

6. The aspirating airbag cushion assembly of claim 5, wherein each of the plurality of inflation ports further comprises a proximal portion adjacent to the expanded distal portion, and wherein the angled surface defines an angle of about 25 degrees relative to the proximal portion of each of the plurality of inflation ports.

7. The aspirating airbag cushion assembly of claim 1, wherein each of the plurality of elongated inflation conduits comprises an inner surface defining a non-circular shape in cross-section.

8. The aspirating airbag cushion assembly of claim 7, wherein the inner surface is elongated in cross-section, and wherein the inner surface defines an elongated axis in cross-section.

9. An aspirating airbag cushion assembly, comprising:
an airbag cushion;
a housing configured to allow for receipt of ambient air into the airbag cushion during inflation of the airbag cushion; and
an inflation module comprising an inflation conduit configured to deliver inflation gas from an inflator, wherein the inflation conduit comprises a plurality of inflation ports, wherein each of the plurality of inflation ports is configured to, upon actuation of the inflator, draw ambient air into the airbag cushion, wherein the inflation conduit is oriented with an upper portion facing towards the airbag cushion and a lower portion facing away from the airbag cushion so as to define a cross-sectional axis between the upper portion and the lower portion, and wherein at least a subset of the plurality of inflation ports is angled away from the cross-sectional axis at an angle of between about 10 degrees and about 30 degrees.

10. The aspirating airbag cushion assembly of claim 9, wherein the inflation conduit is non-circular in cross-section.

11. The aspirating airbag cushion assembly of claim 10, wherein the inflation conduit is elongated in cross-section along the cross-sectional axis such that the cross-sectional axis comprises an elongated axis.

12. The aspirating airbag cushion assembly of claim 9, wherein the inflation conduit comprises an internal upper portion defined by two angled surfaces meeting at an upper tip coincident with the cross-sectional axis.

13. The aspirating airbag cushion assembly of claim 12, wherein the plurality of inflation ports comprises a first row of inflation ports and a second row of inflation ports, wherein each of the inflation ports along the first row is angled away from the upper tip towards a first side of its inflation conduit, and wherein each of the inflation ports along the second row is angled away from the upper tip in an opposite direction relative to the first row and towards a second side of its inflation conduit opposite from the first side.

14. The aspirating airbag cushion assembly of claim 9, wherein at least a subset of the plurality of inflation ports is angled away from the cross-sectional axis at an angle of about 25 degrees.

15. An aspirating airbag cushion assembly, comprising:
an airbag cushion;
a housing configured to allow for receipt of ambient air into the airbag cushion during inflation of the airbag cushion; and
an inflation module comprising an elongated inflation conduit configured to deliver inflation gas from an inflator, wherein the inflation conduit comprises a plurality of inflation ports, wherein each of the plurality of inflation ports is configured to, upon actuation of the inflator, draw ambient air into the airbag cushion, and wherein the inflation conduit comprises a first row of inflation ports angled towards a first side of the housing to direct inflation gas towards the first side of the housing and a second row of inflation ports angled towards a second side of the housing to direct inflation gas towards the second side of the housing, the second side of the housing being opposite from the first side.

16. The aspirating airbag cushion assembly of claim 15, wherein each of the inflation ports in the first row is configured to direct inflation gas at an angle of between about 10 and about 30 degrees in a first direction relative to a cross-sectional axis of the inflation conduit defined in a direction at least substantially perpendicular to a primary axis of the inflation conduit that defines a path for inflation gas prior to exiting through the inflation ports, and wherein each of the inflation ports in the second row is configured to direct inflation gas at an angle of about between about 10 and about 30 degrees in a second direction relative to the cross-sectional axis of the inflation conduit, the second direction being opposite from the first direction relative to the cross-sectional axis.

17. The aspirating airbag cushion assembly of claim 16, wherein each of the inflation ports in the first row is configured to direct inflation gas at an angle of about 25 degrees in the first direction relative to the cross-sectional axis of the inflation conduit, and wherein each of the inflation ports in the second row is configured to direct inflation gas at an angle of about 25 degrees in the second direction relative to the cross-sectional axis of the inflation conduit.

18. The aspirating airbag cushion assembly of claim 17, wherein each of the inflation ports comprises an expanded distal portion.

19. The aspirating airbag cushion assembly of claim 18, wherein the expanded distal portion is defined, at least in part, by an angled surface angled towards the cross-sectional axis of the inflation conduit.

20. The aspirating airbag cushion assembly of claim 19, wherein the angled surface is at least substantially parallel with the cross-sectional axis.

* * * * *